(12) United States Patent
Ando

(10) Patent No.: US 11,834,865 B2
(45) Date of Patent: Dec. 5, 2023

(54) LID SYSTEM

(71) Applicant: TOYOTA JIDOSHA KABUSHIKI KAISHA, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 17/679,895

(22) Filed: Feb. 24, 2022

(65) Prior Publication Data

US 2022/0275664 A1  Sep. 1, 2022

(30) Foreign Application Priority Data

Mar. 1, 2021  (JP) ................. 2021-031387

(51) Int. Cl.
| | | |
|---|---|---|
| *E05B 43/00* | (2006.01) | |
| *E05B 83/34* | (2014.01) | |
| *E05B 81/76* | (2014.01) | |
| *E05B 81/00* | (2014.01) | |
| *E05B 81/04* | (2014.01) | |
| *B60R 25/01* | (2013.01) | |

(52) U.S. Cl.
CPC ............ *E05B 43/005* (2013.01); *B60R 25/01* (2013.01); *E05B 81/01* (2013.01); *E05B 81/04* (2013.01); *E05B 81/76* (2013.01); *E05B 83/34* (2013.01)

(58) Field of Classification Search
None
See application file for complete search history.

(56) References Cited

U.S. PATENT DOCUMENTS

| | | | |
|---|---|---|---|
| 2014/0230499 A1* | 8/2014 | Tokoro ................... | E05B 81/00 70/267 |
| 2016/0257211 A1* | 9/2016 | Kimura ................... | B60L 53/16 |
| 2020/0217108 A1* | 7/2020 | Kinomura ............... | E05B 81/62 |

FOREIGN PATENT DOCUMENTS

| | | |
|---|---|---|
| CN | 212124843 U | 12/2020 |
| JP | 2005-280586 A | 10/2005 |
| JP | 2014-159673 A | 9/2014 |
| JP | 2020-097816 A | 6/2020 |

* cited by examiner

*Primary Examiner* — Carlos Garcia
(74) *Attorney, Agent, or Firm* — Dinsmore & Shohl LLP

(57) ABSTRACT

A lid system includes: a lid for a vehicle, the lid being configured to be opened when the vehicle is supplied with energy; a lid locking device for the lid; a control device configured to control the lid locking device; and a switch operable by a user. When the switch is turned on, the control device interlocks a locked state and an unlocked state of the lid locking device with a locked state and an unlocked state of a door locking device for a door of the vehicle. When the switch is turned off, the control device does not interlock the locked state and the unlocked state of the lid locking device with the locked state and the unlocked state of the door locking device.

3 Claims, 2 Drawing Sheets

LID SYSTEM

CROSS-REFERENCE TO RELATED APPLICATION

This application claims priority to Japanese Patent Application No. 2021-031387 filed on Mar. 1, 2021, incorporated herein by reference in its entirety.

BACKGROUND

1. Technical Field

The present disclosure relates to a lid system.

2. Description of Related Art

In the related art, as a lid system of this type, a lid system including a lid of a vehicle that is opened when the vehicle is supplied with energy, a lid locking device for the lid, and a control device configured to control the lid locking device is proposed (e.g., see Japanese Unexamined Patent Application Publication No. 2014-159673 (JP 2014-159673 A)). In the lid system, in a case where a door locking device for a door of the vehicle is changed from an unlocked state to a locked state at the time when the vehicle stops, the lid locking device is changed from an unlocked state to a locked state late after the door locking device is changed to the locked state. Further, in a case where the door locking device is changed from the locked state to the unlocked state at the time when the vehicle stops, the lid locking device is changed from the locked state to the unlocked state immediately or late after the door locking device is changed to the unlocked state.

SUMMARY

In the above lid system, the locked state and the unlocked state of the lid locking device are interlocked with the locked state and the unlocked state of the door locking device of the vehicle. Accordingly, in order to bring the lid locking device into the unlocked state, it is necessary to bring the door locking device into the unlocked state.

A main object of a lid system of the present disclosure is to bring a lid locking device into an unlocked state without bringing a door locking device into an unlocked state at the time when a vehicle is supplied with energy.

In order to achieve the main object, the lid system of the present disclosure employs the following approach.

A lid system according to the present disclosure is a lid system including a lid for a vehicle, a lid locking device for the lid, a control device, and a switch. The lid is configured to be opened when the vehicle is supplied with energy. The control device is configured to control the lid locking device. The switch is operable by a user. When the switch is turned on, the control device interlocks a locked state and an unlocked state of the lid locking device with a locked state and an unlocked state of a door locking device for a door of the vehicle. When the switch is turned off, the control device does not interlock the locked state and the unlocked state of the lid locking device with the locked state and the unlocked state of the door locking device.

In the lid system of the present disclosure, when the switch operable by the user is turned on, the locked state and the unlocked state of the lid locking device is interlocked with the locked state and the unlocked state of the door locking device for the door of the vehicle. When the switch is turned off, the locked state and the unlocked state of the lid locking device are not interlocked with the locked state and the unlocked state of the door locking device. Accordingly, when the user turns off the switch, the lid lock device can be brought into the unlocked state even without bringing the door locking device into the unlocked state. Further, when the switch is turned on, the state of the lid locking device can be interlocked with the state of the door locking device. Here, the switch may be configured as a hardware switch or may be configured as a software switch displayed on a display or the like.

In the lid system of the present disclosure, when the switch is turned off, the control device may bring the lid locking device into the unlocked state regardless of whether the door locking device is in the locked state or in the unlocked state. With this configuration, in a case where the switch is turned on, the door locking device is in the locked state, and therefore the lid locking device is in the locked state, when the user turns off the switch, the lid lock device can be brought into the unlocked state even without bringing the door locking device into the unlocked state.

In the lid system of the present disclosure, the lid may be a charging lid configured to be opened to expose an inlet connected to a power storage device of the vehicle when the power storage device is charged with electric power from an external power source.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next will be described a mode for carrying out the disclosure with reference to an embodiment.

Figure 1:
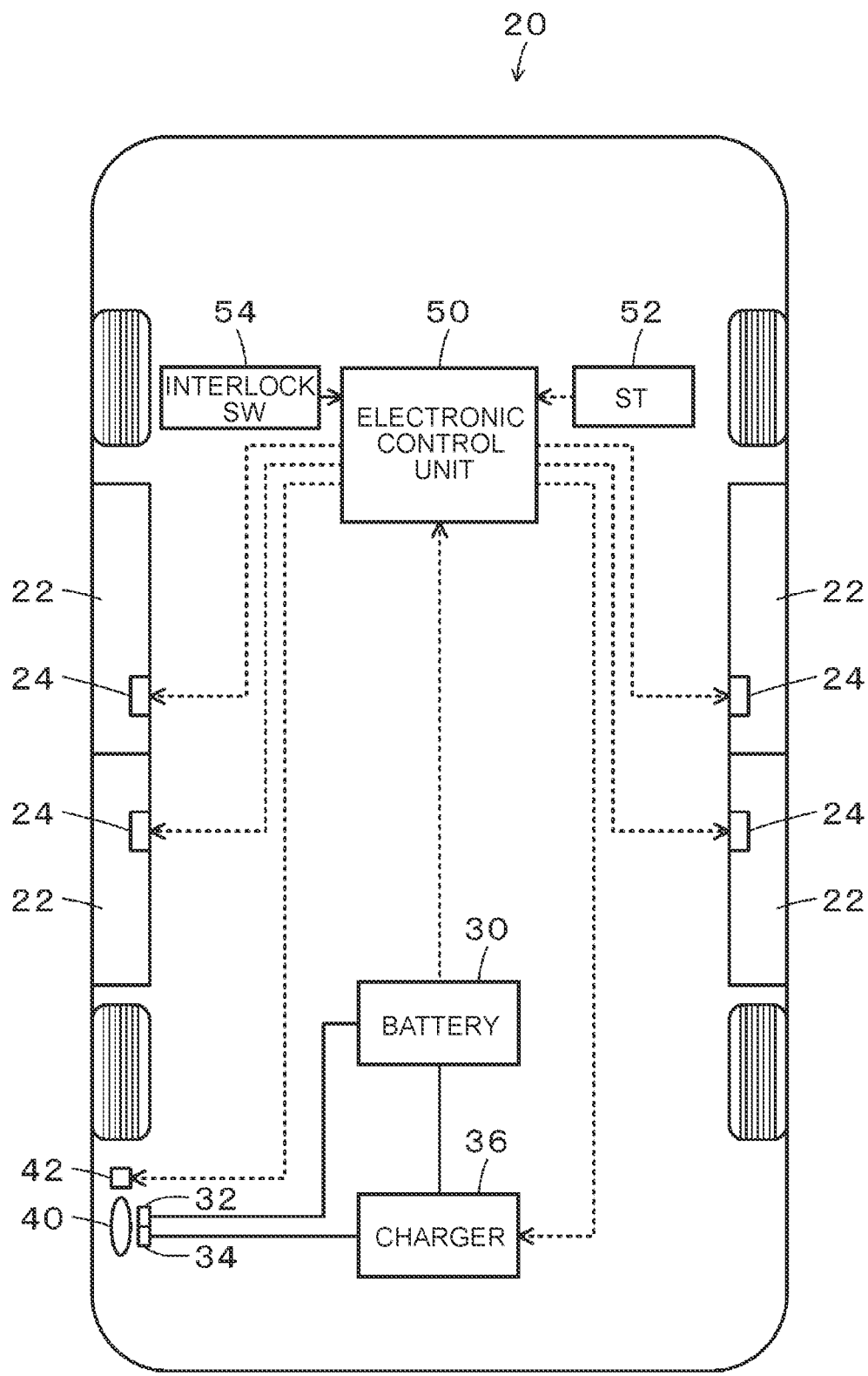
FIG. 1 is a configuration diagram illustrating an outline of a configuration of an automobile 20 including a lid lock system as one embodiment of the present disclosure.

FIG. 1 is a configuration diagram illustrating an outline of a configuration of an automobile 20 including a lid lock system as one embodiment of the present disclosure. The automobile 20 of the embodiment is configured as an electric vehicle including a drive motor. As illustrated herein, the automobile 20 includes a plurality of doors 22, a plurality of door locking devices 24, a battery 30, a direct-current inlet 32, an alternating-current inlet 34, a charger 36, a charging lid 40, a charging lid locking device 42, an interlock switch 54, and an electronic control unit 50. The lid lock system of the embodiment mainly corresponds to the charging lid 40, the charging lid locking device 42, the interlock switch 54, and the electronic control unit 50.

The doors 22 are attached to a vehicle body via hinge mechanisms, respectively, for example. The door locking devices 24 are each configured to change between a locked state and an unlocked state. The locked state is a state where a corresponding door 22 cannot be opened, and the unlocked state is a state where the corresponding door 22 can be opened. More specifically, the door locking devices 24 are each controlled by the electronic control unit 50 such that the locked state and the unlocked state are changed from one to the other due to advance or retreat of a lock pin by an actuator such as a motor, for example.

The battery 30 is configured as a lithium-ion secondary battery or a nickel hydride secondary battery, for example, and exchanges electric power with a drive motor or the like. The direct-current inlet 32 and the alternating-current inlet 34 are placed side by side in a lid box (not illustrated) provided in a charging inlet. The direct-current inlet 32 is configured such that a charger cable of a charging stand in a charging station or the like is connectable to the direct-current inlet 32. The charging stand is configured to convert alternating-current power from an external power source (a commercial power source) into direct-current power and supply the direct-current power to the vehicle.

The alternating-current inlet 34 is configured such that a charger cable connected to an alternating-current power source (a commercial power source) at home or the like is connectable to the alternating-current inlet 34. The charger 36 is connected to the alternating-current inlet 34 and the battery 30. When an alternating-current power source is connected to the alternating-current inlet 34 via a charger cable, the charger 36 is controlled by the electronic control unit 50 such that the charger 36 converts alternating-current power from the alternating-current power source into direct-current power, adjusts a voltage (electric power), and supplies the direct-current power to the battery 30.

The charging lid 40 is attached to the vehicle body via a hinge mechanism, for example, such that a charging inlet where the direct-current inlet 32 and the alternating-current inlet 34 are placed can be exposed. When the charging lid locking device 42 in an unlocked state is pushed by a user, the charging lid 40 is opened. The charging lid locking device 42 is configured to be changeable between a locked state and an unlocked state. The locked state is a state where the charging lid 40 cannot be opened, and the unlocked state is a state where the charging lid 40 can be opened. More specifically, the charging lid locking device 42 is controlled by the electronic control unit 50 such that the charging lid locking device 42 is changed between the locked state and the unlocked state due to advance or retreat of a lock pin by an actuator such as a motor, for example.

The interlock switch 54 is a switch placed around a driver seat and operated by the user to change whether the state of the charging lid locking device 42 is interlocked with the state of the door locking devices 24 or not. The interlock switch 54 may be configured as a hardware switch or may be configured as a software switch displayed on a display or the like.

The electronic control unit 50 includes a micro processing unit including a CPU, a ROM, a RAM, a flash memory, an input port, an output port, and a communications port. Signals from various sensors are input into the electronic control unit 50 via the input port. Examples of the signals input into the electronic control unit 50 can include a start signal from a start switch 52 and an interlocking signal from the interlock switch 54. Various control signals are output from the electronic control unit 50 via the output port. Examples of the signals output from the electronic control unit 50 include control signals to the door locking devices 24, a control signal to the charger 36, and a control signal to the charging lid locking device 42.

In the automobile 20 configured as such in the embodiment, the electronic control unit 50 brings the door locking devices 24 into the locked state or the unlocked state based on operations by the user on a door lock switch, a portable, or the like (not illustrated) provided inside the vehicle cabin.

Figure 2:
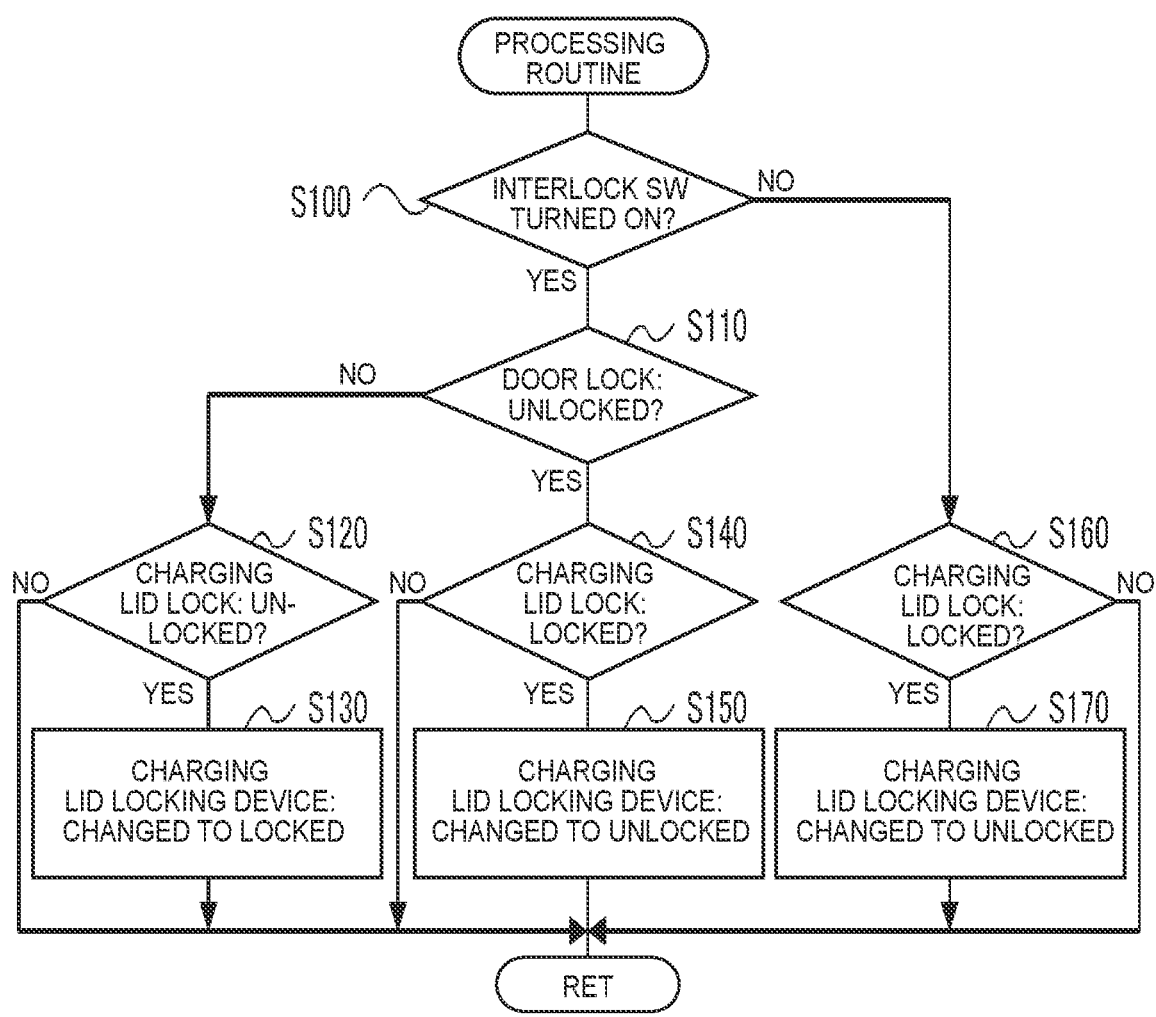
FIG. 2 is a flowchart illustrating one example of a processing routine to be executed by an electronic control unit 50.

Next will be described an operation of the automobile 20 configured as such in the embodiment, particularly, a control on the charging lid locking device 42. FIG. 2 is a flowchart illustrating one example of a processing routine to be executed by the electronic control unit 50. This routine is executed repeatedly when the vehicle stops and the system is turned off (the start switch 52 is turned off).

When the processing routine of FIG. 2 is executed, the electronic control unit 50 first determines based on an interlocking signal from the interlock switch 54 whether the interlock switch 54 is turned on or off (step S100). When the interlock switch 54 is determined to be turned on, the electronic control unit 50 determines whether all the door locking devices 24 are in the locked state or at least one of them is in the unlocked state (step S110).

When all the door locking devices 24 are determined to be in the locked state in step S110, the electronic control unit 50 determines whether the charging lid locking device 42 is in the locked state or in the unlocked state (step S120). When the charging lid locking device 42 is determined to be in the unlocked state, the charging lid locking device 42 is changed to the locked state (step S130). Here, the routine is ended. On the other hand, when the charging lid locking device 42 is determined to be in the locked state, the routine is ended. In this case, the charging lid locking device 42 is kept in the locked state. Accordingly, when the interlock switch 54 is turned on and all the door locking devices 24 are in the locked state, the charging lid locking device 42 is brought into the locked state (the charging lid locking device 42 is changed from the unlocked state to the locked state or kept in the locked state).

When at least one of the door locking devices 24 is determined to be in the unlocked state in step S110, the electronic control unit 50 determines whether the charging lid locking device 42 is in the locked state or in the unlocked state (step S140). When the charging lid locking device 42 is determined to be in the locked state, the charging lid locking device 42 is changed to the unlocked state (step S150). Here, the routine is ended. In the meantime, when the charging lid locking device 42 is determined to be in the unlocked state, the routine is ended. In this case, the charging lid locking device 42 is kept in the unlocked state. Accordingly, when the interlock switch 54 is turned on and at least one of the door locking devices 24 is in the unlocked state, the charging lid locking device 42 is brought into the unlocked state (the charging lid locking device 42 is changed from the locked state to the unlocked state or kept in the unlocked state).

When the interlock switch 54 is determined to be turned off in step S100, the electronic control unit 50 determines whether the charging lid locking device 42 is in the locked state or in the unlocked state (step S160). When the charging lid locking device 42 is determined to be in the locked state, the charging lid locking device 42 is changed to the unlocked state (step S170). Here, the routine is ended. In the meantime, when the charging lid locking device 42 is determined to be in the unlocked state, the routine is ended. In this case, the charging lid locking device 42 is kept in the unlocked state. Accordingly, when the interlock switch 54 is turned off, the charging lid locking device 42 is brought into the unlocked state (the charging lid locking device 42 is changed from the locked state to the unlocked state or kept in the unlocked state) regardless of whether all the door locking devices 24 are in the locked state or at least one of them is in the unlocked state.

With such a process, when the interlock switch 54 is turned on, all the door locking devices 24 are in the locked state, and therefore the charging lid locking device 42 is in the locked state, the user turns off the interlock switch 54. Hereby, the charging lid locking device 42 can be brought into the unlocked state even without bringing at least one of the door locking devices 24 into the unlocked state. Further, when the interlock switch 54 is turned on, the unlocked state and the locked state of the charging lid locking device 42 can be interlocked with the locked state and the unlocked state of the door locking devices 24.

In the automobile 20 of the embodiment described above, in a case where the interlock switch 54 is turned on, when all the door locking devices 24 are in the locked state, the charging lid locking device 42 is brought into the locked state, and when at least one of the door locking devices 24 is in the unlocked state, the charging lid locking device 42 is brought into the unlocked state. In the meantime, in a case where the interlock switch 54 is turned off, the charging lid locking device 42 is brought into the unlocked state regardless of whether or not all the door locking devices 24 are in the locked state or at least one of the door locking devices 24 is in the unlocked state. Hereby, when the interlock switch 54 is turned on, all the door locking devices 24 are in the locked state, and therefore the charging lid locking device 42 is in the locked state, the user turns off the interlock switch 54, so that the charging lid locking device 42 can be brought into the unlocked state even without bringing at least one of the door locking devices 24 into the unlocked state.

In the automobile 20 of the embodiment, in a case where the interlock switch 54 is turned on, when all the door locking devices 24 are in the locked state, the charging lid locking device 42 is brought into the locked state, and when at least one of the door locking devices 24 is in the unlocked state, the charging lid locking device 42 is brought into the unlocked state. However, in a case where the interlock switch 54 is turned on, when the door locking device 24 for a specific door 22 (e.g., the door 22 for a driver seat) among the doors 22 is in the locked state, the charging lid locking device 42 may be brought into the locked state, and when the door locking device 24 for the specific door 22 is in the unlocked state, the charging lid locking device 42 may be brought into the unlocked state.

In the embodiment, the automobile 20 is configured as an electric vehicle including the drive motor or the battery 30, and the automobile 20 includes the charging lid 40 and the charging lid locking device 42. However, the automobile 20 may be configured as a general automobile that includes an engine configured to output power by use of fuel such as a gasoline but does not include a drive motor, or the automobile 20 may be configured as a hybrid vehicle including an engine, a motor, and the battery 30, and therefore, the automobile 20 may include a fuel lid and a fuel lid device instead of or in addition to the charging lid 40 and the charging lid locking device 42. The fuel lid is attached to the vehicle body via a hinge mechanism, for example, such that a fuel filler for a fuel tank in which fuel is stored can be exposed. The fuel lid locking device is configured to be changeable between a locked state and an unlocked state. The locked state is a state where the fuel lid cannot be opened, and the unlocked state is a state where the fuel lid can be opened. In a case where the automobile 20 includes the fuel lid and the fuel lid device, when the interlock switch 54 is turned on, the locked state and the unlocked state of the fuel lid locking device may be interlocked with the locked state and the unlocked state of the door locking devices 24, and when the interlock switch 54 is turned off, the fuel lid locking device may be brought into the unlocked state regardless of whether the door locking devices 24 are in the locked state or in the unlocked state.

The following describes a correspondence between main elements of the embodiment and main elements of the disclosure described in the field of SUMMARY. In the present embodiment, the charging lid 40 corresponds to the "lid," the electronic control unit 50 and the charging lid locking device 42 correspond to the "control device," and the interlock switch 54 corresponds to the "switch."

Note that, since the embodiment is an example to specifically describe a mode for carrying out the disclosure described in the field of SUMMARY, the correspondence between the main elements of the embodiment and the main elements of the disclosure described in the field of SUMMARY does not limit the elements of the disclosure described in the field of SUMMARY. That is, the disclosure described in the field of SUMMARY should be interpreted based on the description of the field, and the embodiment is just a concrete example of the disclosure described in the field of SUMMARY.

The mode for carrying out the disclosure has been described with reference to the embodiment, but it is needless to say that the applicable embodiment is not limited to the above embodiment at all and may be performable in various embodiments as long as the various embodiments are not beyond the gist thereof.

The present disclosure is applicable to a manufacture industry or the like of a lid system.

What is claimed is:

1. A lid system comprising:
a lid for a vehicle, the lid being configured to be opened when the vehicle is supplied with energy;
a lid locking device for the lid;
a control device configured to control the lid locking device; and
a switch operable by a user, wherein:
when the switch is turned on, the control device interlocks a locked state and an unlocked state of the lid locking device with a locked state and an unlocked state of a door locking device for a door of the vehicle; and
when the switch is turned off, the control device does not interlock the locked state and the unlocked state of the lid locking device with the locked state and the unlocked state of the door locking device.

2. The lid system according to claim 1, wherein, when the switch is turned off, the control device brings the lid locking device into the unlocked state regardless of whether the door locking device is in the locked state or in the unlocked state.

3. The lid system according to claim 1, wherein the lid is a charging lid configured to be opened to expose an inlet connected to a power storage device of the vehicle when the power storage device is charged with electric power from an external power source.

* * * * *